W. J. WEBSTER.
RAKE.
APPLICATION FILED AUG. 27, 1913.
1,099,954.
Patented June 16, 1914.
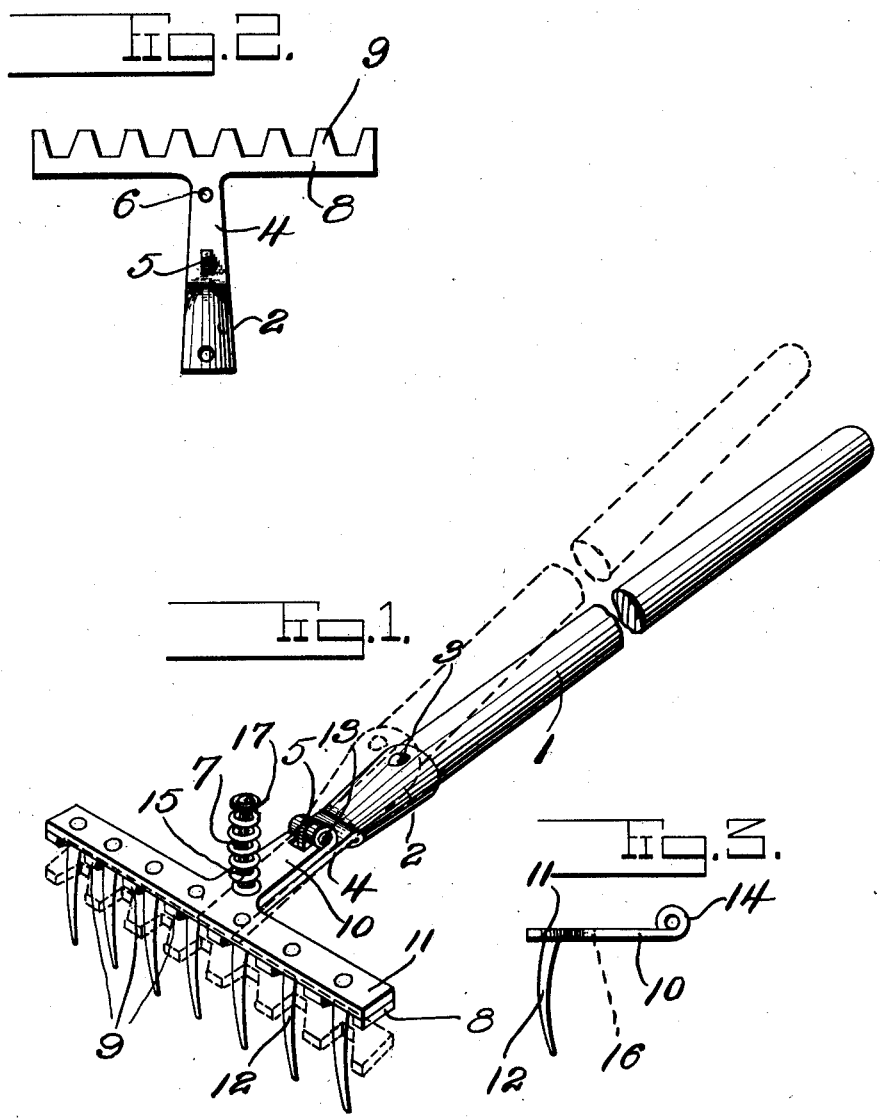

UNITED STATES PATENT OFFICE.

WILLIAM JAMES WEBSTER, OF BISBEE, ARIZONA, ASSIGNOR OF ONE-FOURTH TO THOMAS H. PARRY AND ONE-FOURTH TO LEONARD PARRY, OF BISBEE, ARIZONA.

RAKE.

1,099,954.   Specification of Letters Patent.   Patented June 16, 1914.

Application filed August 27, 1913. Serial No. 786,889.

*To all whom it may concern:*

Be it known that I, WILLIAM J. WEBSTER, a citizen of the United States, residing at Bisbee, in the county of Cochise and State of Arizona, have invented certain new and useful Improvements in Rakes; and I do hereby declare the following to be a full, clear, and exact description of the invention, such as will enable others skilled in the art to which it appertains to make and use the same.

This invention relates to new and useful improvements in rakes and has for its object the provision of a device of the above character which is particularly adapted for use on lawns and the like where trash such as leaves and paper are apt to gather.

An object of my invention is the provision of a rake of the above character which may be used in the ordinary manner and when trash or litter has gathered on the teeth thereof said teeth will be stripped of such trash or litter without inconveniencing the operator.

Another object of my invention is the provision of such a device which will automatically return to its normal position in order that the raking may proceed without delay.

A still further object of my invention is the provision of such a device which will eliminate the use of complicated mechanism for accomplishing the desired result.

With the above and other objects in view I now proceed to describe my invention in the following specification and accompanying drawings, in which—

Figure 1 is a detail perspective view of my improved rake, Fig. 2 is a top plan view of the stripping bar, and Fig. 3 is a side view of the tooth carrying member.

Referring to the drawings by characters of reference 1 indicates the handle of my improved rake having secured at the lower end thereof a suitable sleeve 2. This sleeve 2 is held in position on the handle by means of a suitable screw or nail 3, which extends transversely into the handle and is adapted to prevent the sleeve 2 from becoming accidentally displaced with relation thereto. A suitable extension 4 is formed integrally with the sleeve and has secured thereto the upstanding ear 5 which is provided with a transversely extending aperture, the use of which will be more fully hereinafter described. A suitable aperture 6 is formed adjacent the outer end of the extension 4 and is adapted to receive the shank of a segmental bolt or rivet 7, which is loosely mounted therein. Formed integrally with the outer extremity of the extension 4 and extending transversely with relation thereto I preferably provide the stripping bar 8, which is recessed as clearly illustrated to form the teeth 9 which are adapted to lie between the rake teeth and force the litter therefrom when the device is in use.

Pivotally secured to the ear 5 I preferably provide a stem 10 having formed integrally with the outer extremity thereof the transversely extending bar 11 which is provided with suitable apertures in which the upper extremities of the teeth 12 are adapted to be secured. This stem 10 is held in pivotal relation with the handle by means of the bolt or rivet 13 which extends transversely through the aperture in the ear 5 and the bent portion 14, of the stem 10.

A suitable coil spring 15 is adapted to bear against the upper surface of the stem 10 and surround the aperture 16, formed therein. This aperture 16 is adapted to aline with the aperture 6 formed in the extension 4 and receive the shank of the segmental rivet 7 which has secured at its upper extremity the washer 17 against which the upper extremity of the coil spring 15 is adapted to press.

It will be apparent from the foregoing that with my improved rake when litter or trash gathers upon the teeth during the process of raking the only operation necessary is the slight downward pressure on the handle at a point immediately adjacent the lower extremity which will cause the stripping bar to pass downwardly with relation to the rake teeth and force any trash or litter off the ends thereof. Owing to the spring action which tends to force the bar back to its normal position it will be obvious that the same will be returned to the raised position and the process of raking may proceed, thereby eliminating the objectionable method of pulling the trash or litter from the rake teeth by hand.

While in the foregoing I have shown and described the preferred embodiment of my invention I wish it to be understood that I may change the specific arrangement and combination of parts without in any way departing from the spirit and scope of my invention as defined in the appended claims.

What is claimed is:—

1. A rake comprising a handle, a sleeve secured to the lower end thereof, a longitudinal extension formed integrally with said sleeve, a stripping bar at the outer extremity of the longitudinal extension, said longitudinal extension having an aperture near its outer end, a segmental bolt adapted to extend through said aperture, a stem pivotally secured to the longitudinal extension adjacent the sleeve, a transversely extending bar at the outer extremity of the stem, teeth secured to the bar at spaced intervals, the segmental bolt being adapted to extend through an aperture in the stem, and a spring intermediate the upper end of the segmental bolt and the upper surface of the stem, whereby the teeth are normally forced downwardly with relation to the stripping bar.

2. In a rake, a head comprising a T-shaped member, lateral extensions formed on the arms of the T-shaped member and extending outwardly therefrom, a sleeve formed integral with the free end of the stem of the T-shaped member, an apertured ear secured to the T-shaped member near the sleeve, said T-shaped member having an aperture in the stem adjacent the point where the arms join the stem, a second T-shaped member, said second T-shaped member having teeth secured thereto, said teeth being adapted to lie between the lateral extensions on the first mentioned T-shaped member, the free end of the stem of the second mentioned T-shaped member being bifurcated and bent to form a pair of loops, a rivet adapted to extend through the loops and through the aperture in the ear and pivotally secure the second mentioned T-shaped member to the first mentioned T-shaped member and means to normally hold the T-shaped members yieldably together.

In testimony whereof I affix my signature in presence of two witnesses.

WILLIAM JAMES WEBSTER.

Witnesses:
WILLIAM H. POLLGREEN,
J. T. QUICK.

Copies of this patent may be obtained for five cents each, by addressing the "Commissioner of Patents, Washington, D. C."